United States Patent [19]

Sudo

[11] Patent Number: 5,342,888
[45] Date of Patent: Aug. 30, 1994

[54] COATING COMPOSITION

[75] Inventor: Nobuhisa Sudo, Kanagawa, Japan

[73] Assignee: Nippon Paint Co., Ltd., Osaka, Japan

[21] Appl. No.: 143,381

[22] Filed: Oct. 29, 1993

Related U.S. Application Data

[63] Continuation of Ser. No. 783,223, Oct. 28, 1991, abandoned.

[51] Int. Cl.$^5$ .................. C08L 31/00; C08L 61/28
[52] U.S. Cl. .................... 525/124; 525/157; 525/162; 525/520
[58] Field of Search ............... 525/124, 151, 162, 520

[56] References Cited

U.S. PATENT DOCUMENTS

| | | | |
|---|---|---|---|
| 4,388,445 | 6/1983 | Sugiura et al. | 525/162 |
| 4,554,214 | 11/1985 | Ichinomiya et al. | 428/423.7 |
| 4,654,398 | 3/1987 | McFadden | 525/162 |
| 4,687,822 | 8/1987 | Eguichi et al. | 526/265 |
| 4,789,707 | 12/1988 | Nishimura et al. | 525/157 |
| 4,892,906 | 1/1990 | Pham et al. | 524/730 |
| 4,985,500 | 1/1991 | Yamamoto et al. | 525/163 |

FOREIGN PATENT DOCUMENTS

| | | |
|---|---|---|
| 59-36112 | 2/1984 | Japan . |
| 60-67515 | 4/1985 | Japan . |
| 61-143472 | 7/1986 | Japan . |

*Primary Examiner*—James J. Seidleck
*Assistant Examiner*—Thomas Hamilton, III
*Attorney, Agent, or Firm*—Foley & Lardner

[57] ABSTRACT

A coating composition is disclosed, comprising from 50 to 80 parts by weight of an acrylic resin having a number-average molecular weight of from 1,800 to 8,000, a hydroxyl value of from 60 to 120, and an acid value of from 1 to 25 and from 50 to 20 parts by weight of a hardener consisting of blocked aliphatic polyfunctional isocyanates and/or blocked alicyclic polyfunctional isocyanates and an alkyl-etherified melamine resin, the proportion of said melamine resin to said isocyanates being from 50/50 to 95/5 by weight. And a coated article comprising the above coating composition and a method to form the coated film and the coated article are disclosed.

7 Claims, No Drawings

COATING COMPOSITION

This application is a continuation of application Ser. No. 07/783,223, filed Oct. 28, 1991 now abandoned.

FIELD OF THE INVENTION

The present invention relates to a coating composition, particularly a top-coating composition for automobiles, and a method to form the coating film.

BACKGROUND OF THE INVENTION

Acidic rain is one of the recent factors which deteriorate the top-coating composition for automobiles. Coating films formed from acrylic or polyester resin-based coating compositions which have been most extensively used as top-coating compositions to date occur appearance defects, such as spotting, discoloration, etc., due to acidic rain and there are cases where these defects lead to film destruction.

On the other hand, coating compositions which give coating films with good resistance to acidic rain, such as silicone resin-based, fluororesin-based, or polyurethane resin-based coating compositions, are disadvantageous in that they are costly and poor in coating workability.

JP-A-61-143472 discloses a coating composition comprising a thermosetting acrylic resin having a Tg of 0° C. or less, a hydroxyl value of from 20 to 130, and an acid value of from 6 to 40 and a butylated melamine resin as a crosslinking agent. (The term "JP-A" as used herein means an "unexamined published Japanese patent application"). In this reference, there is a description that a small proportion of an isocyanate may be used in combination with the butylated melamine resin, but there is no description concerning effects obtained by the combined use of the two ingredients.

JP-A-60-67515 discloses a coating composition which comprises an acrylic copolymer containing ε-caprolactone-modified vinyl monomer and having a hydroxyl value of from 20 to 200 and a polyester resin, in which the polymers are heat-cured with a crosslinking agent which is an aminoaldehyde resin and/or an isocyanate. However, not only this reference fails to describe effects of the combined use of a melamine resin and an isocyanate, but also according this technique, an acrylic resin should be used in combination with a polyester resin.

JP-A-59-36112 discloses a coating composition which comprises an acrylic copolymer having a Tg of 50° C. or less and in which in the case where this copolymer contains an active hydroxyl group or active amide group, a crosslinking agent that is a polyfunctional isocyanate, an aminoadehyde resin, or a mixture thereof may be used. However, this reference does not describe effects obtained by the combined use of these crosslinking agents.

The acidic resistance of coating films obtained by any of the above-described prior art techniques is insufficient and is lower than the level attained by the present invention.

SUMMARY OF THE INVENTION

An object of the present invention is to provide a coating composition which gives coating films having excellent resistance to acidic rain, although a commonly used resin excellent in cost, workability, etc. is employed therein.

Another object of the present invention is to provide a method to form the coating film.

Still another object of the present invention is to provide a coated article having a top coat formed from the above coating composition.

The above objects and other objects are achieved by the coating composition described below.

The coating composition of the present invention comprises, as a major component, a vehicle obtained by mixing an acrylic resin having a number-average molecular weight of from 1,800 to 8,000, a hydroxyl value of from 60 to 120, and an acid value of from 1 to 25 with a hardener consisting of blocked aliphatic polyfunctional isocyanates and/or blocked alicyclic polyfunctional isocyanates and an alkyl-etherified melamine resin added successively, wherein the amount of the acrylic resin is from 50 to 80 parts by weight, the total amount of the blocked polyfunctional isocyanates and the alkyl-etherified melamine resin is from 50 to 20 parts by weight and the proportion of the alkyl-etherified melamine resin to the blocked polyfunctional isocyanates is from 50/50 to 90/5 by weight. Accordingly, use of this coating composition is an effective means in protecting automobiles from acidic rain which is becoming serious.

DETAILED DESCRIPTION OF THE INVENTION

The acrylic resin having a number-average molecular weight of from 1,800 to 8,000, a hydroxyl value of from 60 to 120, and an acid value of from 1 to 25 to be contained in the coating composition of the present invention can be obtained, for example, by polymerizing such monomers as described below by an ordinary method (for example, the method according to U.S. Pat. No. 4,687,822).

Examples of the usable monomers include (1) ethylenically unsaturated monomers having a hydroxyl group, such as hydroxymethyl (meth)acrylate, hydroxyethyl (meth)acrylate, hydroxypropyl (meth)acrylate, hydroxybutyl (meth)acrylate, N-methylolacrylamine, and the like, (2) ethylenically unsaturated monomers having a carboxyl group, such as (meth)acrylic acid, crotonic acid, itaconic acid, fumaric acid, maleic acid, and the like, and (3) ethylenically unsaturated monomers copolymerizable with the above monomers (1) and (2), such as (meth)-acrylic acid alkyl esters including methyl (meth)acrylate, ethyl (meth)acrylate, propyl (meth)acrylate, butyl acrylate, n-propyl acrylate, n-butyl acrylate, isobutyl acrylate, 2-ethylhexyl acrylate, n-octyl acrylate, and n-dodecyl acrylate, and the like. Other examples of usable monomers include (meth)acrylonitrile, styrene, and the like.

If the number-average molecular weight of the acrylic resin contained in the coating composition of the present invention is less than 1,800, insufficient crosslinking is obtained and thereby sufficient film quality cannot be obtained. If the number-average molecular weight thereof is more than 8,000, the viscosity of the coating composition is so high that coating films having good surface smoothness and good appearance cannot be obtained. The range of the number-average molecular weight of the acrylic resin is preferably from 3,000 to 7,000 and more preferably from 3500 to 5500. Hydroxyl values of the acrylic resin which are outside the above-specified range are not preferred in that if the hydroxyl value thereof is less than 60, the coating composition not only shows poor adhesion properties but also has impaired curability, while hydroxyl values exceeding 120 result in coating films having impaired water and acid resistance because of the remaining hydroxyl groups. The range of the hydroxyl value of the acrylic resin is preferably from 80 to 110 and more preferably from 85 to 105.

Acid values of the acrylic resin which are outside the above-specified range are not preferred in that if the acid value thereof is less than 1, the coating composition cannot cure sufficiently, while if it exceeds 25, the storage stability of the coating composition becomes poor or the coating composition is cured too quickly and thereby coating films with good surface smoothness cannot be obtained. The range of the acid value of the acrylic resin is preferably from 5 to 20 and more preferably from 8 to 15.

The crosslinking agent (i.e., the hardener) to be mixed with the above-described acrylic resin, according to the present invention, consists of a combination of an alkyl-etherified melamine resin and blocked aliphatic polyfunctional isocyanates and/or blocked alicyclic polyfunctional isocyanates (hereinafter referred to as "blocked isocyanates").

Examples of the alkyl-etherified melamine resin include alkoxymethylmelamine resins in which the alkoxyl group is methoxy group, ethoxy group, n-butoxy group, isobutoxy group, or the like, such as methylated melamine resins, n-butylated melamine resins, isobutylated melamine resins, and the like. These resins are normally obtained by reacting melamine with an aldehyde such as formaldehyde or paraformaldehyde, using means of an addition reaction or addition condensation reaction and then etherifying the reaction product with a monohydric alcohol having from 1 to 4 carbon atoms.

The alkyl-etherified melamine resin, which can be one synthesized by an ordinary method (for example, the method according to U.S. Pat. No. 4,789,707) as described above, to be contained in the coating composition of the present invention generally has a number-average molecular weight of about from 400 to 1,200.

Molecular weights of the alkyl-etherified melamine resin which are outside the above range are not preferred in that if the number-average molecular weight thereof is less than 400, the proportion of low-molecular-weight components in the melamine resin becomes large and the final coating composition hence has an increased volatile content, while if the number-average molecular weight thereof exceeds 1,200, the coating composition has a decreased solid content upon the painting and thereby gives coating films with poor appearance. The preferred range of the number-average molecular weight of the alkyl-etherified melamine resin is from 600 to 1,000.

If an alkyl-etherified melamine resin only is used to cure acrylic resins, the thus-obtained conventional-type cured coating films cannot have the high degree of acid resistance which the present invention attains.

In the present invention, blocked aliphatic polyfunctional isocyanates and/or blocked aclicyclic polyfunctional isocyanates (hereinafter referred to as "blocked isocyanates") are used in combination with the above-described alkyl-etherified melamine resin.

As the blocked isocyanates, an aliphatic polyfunctional isocyanate such as, for example, non-yellowing hexamethylene diisocyanate (hereinafter referred to as HDI) or an alicyclic polyfunctional isocyanate such as, for example, isophorone diisocyanate (hereinafter referred to as IPDI) or a derivative thereof may be used.

In combination therewith, a small proportion of other kind of isocyanate such as MDI (Methylene Diphenyl Diisocyanate), $H_{12}MDI$ (hydrogenated MDI), or the like may be used. These isocyanates are used in the partly or completely blocked form; the blocked isocyanates become active through thermal dissociation.

Examples of the blocking agents include acetone oxime, cyclohexanone oxime, acetophenone oxime, benzophenone oxime, and the like.

Among the blocked isocyanates, IPDI blocked with MEK (Methyl Ethyl Ketone) oxime is most preferred.

Although the conventional-type cured coating films curing acrylic resins using only blocked isocyanates have a good acid resistance, the desired low-temperature curability, low cost, coating workability, and other properties cannot be attained with such a coating composition, unlike the coating composition of the present invention.

In the present invention, the alkyl-etherified melamine resin and blocked isocyanates are used in combination with the crosslinking agent. The use of the above two kinds of compounds as the crosslinking agent is characterized in that the blocked isocyanates are first mixed with an acrylic resin and the alkyl-etherified melamine resin is then added to the resulting mixture.

Such coating composition obtained by mixing an acrylic resin and the blocked isocyanates beforehand and then adding the alkyl-etherified melamine resin to the resulting mixture shows extremely good stability as compared with coating compositions obtained by mixing all the three ingredients at the same time.

It is important that the proportion of the alkyl-etherified melamine resin to the blocked isocyanates, both as the crosslinking agent (i.e., the hardener), should be in the range of from 50/50 to 95/5 by weight. If the alkyl-etherified melamine resin ratio is less than 50, the coating composition is unable to be sufficiently cured, so that the resulting coating films have poor gas hole properties. If the ratio thereof exceeds 95, a sufficient improvement in the acid resistance cannot be attained. The range of the proportion of the alkyl-etherified melamine resin to the blocked isocyanates is preferably from 70/30 to 90/10 and more preferably from 5/25 to 85/15.

In curing an acrylic resin with the above-described crosslinking agent, from 50 to 80 parts by weight of the acrylic resin is mixed with from 50 to 20 parts by weight of the crosslinking agent. If the amount of the crosslinking agent (i.e., the hardener) is less than 20 parts by weight per 100 parts by weight of the sum of the acrylic resin and the crosslinking agent, sufficiently cured coating films cannot be obtained. If the amount thereof exceeds 50 parts by weight, coating films obtained from such a coating composition have impaired acid resistance in the case where the alkyl-etherified melamine resin ratio in the crosslinking agent is relatively high, and have insufficient film strength in the case where the blocked isocyanates ratio in the crosslinking agent is relatively high. The range of the amount of the crosslinking agent per 100 parts by weight of the sum of the acrylic resin and the crosslinking agent is from 25 to 45 parts by weight.

According to the present invention, the poor acid resistance of melamine resin-crosslinked acrylic coating films can be improved by crosslinking an acrylic resin with an alkyl-etherified melamine resin and blocked isocyanates combined in a proportion in the above-specified range. Therefore, if the alkyl-etherified melamine resin is present in the composition in an amount sufficient to crosslink the acrylic resin, the effects of the present invention cannot be attained.

Other ingredients that can be incorporated into the coating composition of the present invention include the following materials which are commonly used in coating compositions.

That is, the following ingredients, for example, may be used in suitable amounts: a metallic flake pigment having a particle diameter of from 10 to 45 µm, which is selected from aluminum flakes, bronze flakes, tin flakes, gold flakes, silver flakes, copper flakes, titanium metal flakes, stainless-steel flakes, nickel flakes, chromium flakes, cobalt sulfide, manganese sulfide, titanium sulfide, or alloy flakes of these metals, metal flakes coated with a plastic, and flaky phthalocyanine blue; a transparent pigment selected from inorganic transparent pigments such as iron oxides, e.g., Sicotrans Red L2915D, Sicotrans Yellows L1915 and L1916 (all manufactured by BASF A.G.) and organic transparent pigments such as Chromophthal Red A2B (manufactured by Ciba-Geigy A.G.); a dye of a dark color, e.g., red, blue, purple, black, brown, etc., selected, for example, from Orazol Black RL, Orazol Red B, and Orazol Yellow 3R (all manufactured by Ciba-Geigy A.G.); a coloring pigment such as titanium dioxide, cyanine blue, cyanine green, quinacridone, indanthrone, isoindoline, perylene, anthrapyrimidine, carbon black, benzimidazolone, yellow iron oxide, red iron oxide, or the like; a higher boiling point solvent selected from alcohol-type solvents such as ethylene glycol monobutyl ether and ethylene glycol monobutyl ether acetate, hydrocarbon-type solvents such as Solvesso 100 and Solvesso 150 (both manufactured by Exxon Chemical Co.), ether-type solvents such as carbitol acetate and butyl carbitol, ketone-type solvents such as isophorone, and the like; and a lower boiling point solvent selected from ester-type solvents such as ethyl acetate and butyl acetate, aromatic solvents such as toluene and xylene, ketone-type solvents such as methyl ethyl ketone, methyl isobutyl ketone, and acetone, alcohol-type solvents such as methanol, butanol, isopropanol, and ethylene glycol monomethyl ether, and the like.

The coating composition of the present invention may be used for ordinary coatings for automobiles. For example, an iron substrate is covered first with an electrodeposition coatings for the primer coat and an intermediate coatings is applied thereon from 1 to 3 times, and the coating composition of the present invention which contains the above-described resinous ingredients as the vehicle is then applied as a top coatings. Alternatively, after an ordinary solid coatings or metallic lacquer has been top-coated, the coating composition of the present invention may be applied as a clear coating for protecting the top coat.

The coating composition of the present invention is dissolved or dispersed to a solvent (e.g., an organic solvent, etc.) or a dispersant according as the purpose and use to obtain the paint, lacquer or coating solution which is generally called "coating composition", and then the dissolved or dispersed coating composition is coated on the substrate to form a film. As a result, the coated article comprising the coating composition of the present invention can be obtained.

The film thickness, coating equipment, and other coating conditions for the above applications of the coating composition of the present invention may be the same as those for conventional automotive finish-coatings. If the coating composition of the present invention is used as a solid state top-coat or as a clear coat on top coats, use of air spraying or electrostatic coating is advantageous. In this case, the coating composition is prepared to have a viscosity of 20 to 25 seconds for #4 Ford cup at 20° C. and applied at a thickness of from 30 to 50 µm on a dry basis.

The baking (i.e., hardening) and curing conditions for the coating composition of the present invention are substantially the same as those for the conventional acrylic coating compositions containing either a melamine resin or an isocyanate as the crosslinking agent. That is, the baking and curing operation may be conducted at about 120° to 150° C. for about 15 to 30 minutes.

As described above, the coating composition of the present invention eliminates the poor workability of the high-quality polyurethane coatings and, at the same time, has attained improved low-temperature curability and coating film acid resistance, while retaining good easy-handling properties equal to those of the conventional acrylic resin/melamine resin coatings. The coating composition of the present invention also is advantageous in cost.

The present invention will be explained below in more detail with reference to the following examples, but the invention is not construed as being limited thereto.

EXAMPLES 1 TO 7

A 0.8 mm-thick dull-finished steel plate treated with zinc phosphate was coated using the electrodeposition coating method with a cationic electrodeposition-type coating composition ("Power Top U-50", manufactured by Nippon Paint Co., Ltd.) at a thickness of about 25 µm on a dry basis.

On the obtained electrodeposited film, an intermediate coatings ("Orga P-41 Sealer", manufactured by Nippon Paint Co., Ltd.) was coated using the air spraying method at a thickness of about 40 µm on a dry basis. This intermediate wet film was baked at 140° C. for 30 minutes. Thereafter, an acrylic resin-based coating composition ("Superlacq", manufactured by Nippon Paint Co., Ltd.) was applied as a base top coating at a thickness of about 20 µm on a dry basis, and then flash off a solvent for 3 minutes in a wet film. On the other hand, each of the clear coatings having the formulations which are shown in Table 1 was prepared as follows; in Table 1, the varnish amounts are given in terms of solid amount of resin. That is, the acrylic resins were mixed with the blocked isocyanates and a solvent and the resulting mixture was stirred at 80° C. for 30 minutes, and thereby preparing a solution of the acrylic resins and the blocked isocyanates. This solution was cooled to room temperature, and the melamine resins and a solvent were then added to the solution and the resulting mixture was stirred for 20 minutes. Thus, the clear coatings shown in Table 1 were obtained. Each clear coatings was prepared to have a viscosity of 25 seconds as measured with #4 Ford cup, subsequently applied on the above-formed base coat at a thickness of about 40 µm on a dry basis using the air spraying method at a atomizing pressure of 3 kg/cm$^2$, and then flash off a solvent for about 7 minutes in a wet film. The thus-obtained coated films were baked at 120°, 140°, or 160° C. for 30 minutes and then subjected to an acid resistance test. The results obtained are shown in Tables 2 and 3.

For the purpose of comparison, a clear coatings was prepared for Comparative Example 1 by a method in which the same acrylic resins, melamine resins, blocked isocyanates, additives, and solvent as those for the clear coatings of Example 6 were mixed together at a time and the resulting mixture was stirred at 25° C. for 30 minutes. The clear coatings of Example 7, which was the same as that of Example 6, and the clear coatings of Comparative Example 1 were applied after being stored at 5° C. for 14 days.

TABLE 1

Formulations for clear coatings (The varnish amounts are given in terms of solid amount of resin)

| | | Example | | | | | |
|---|---|---|---|---|---|---|---|
| | | 1 | 2 | 3 | 4 | 5 | 6 |
| U-Van | *1 | 12 | 13.5 | 9 | 14 | 22.5 | 14 |
| Super-Beckamine | *2 | 12 | 13.5 | 9 | 14 | 22.5 | 14 |
| Dianal | *3 | 35 | 35 | 35 | 33 | 25 | 33 |
| ACR-461 | *4 | 35 | 35 | 35 | 33 | 25 | 33 |
| BL-3175 | *5 | 6 | 3 | 12 | 6 | 5 | |
| BL-4165 | *6 | | | | | | 6 |
| Acrylic Resin Crosslinking Agent | | 70 | 70 | 70 | 66 | 50 | 66 |
| 1 | *7 | 24 | 27 | 18 | 28 | 45 | 28 |
| 2 | *8 | 6 | 3 | 12 | 6 | 5 | 6 |

*1 U-Van 20N-60: butyl-etherified melamine varnish manufactured by Mitsui Toatsu Chemicals, Inc., Japan
   solid content of resin    60%
*2 Super-Beckamine: butyl-etherified melamine varnish manufactured by Dainippon Ink & Chemicals Inc., Japan
   solid content of resin    60%
*3 Dianal HR-554: acrylic varnish manufactured by Mitsubishi Rayon Co., Ltd., Japan
   solid content of resin    60%
   number-average molecular weight    4,000
   hydroxyl value    95
   acid value    12
*4 ACR-461: acrylic varnish manufactured by Nippon Paint Co., Ltd.
   solid content of resin    55%
   number-average molecular weight    8,000
   hydroxyl value    70
   acid value    20
*5 BL-3175: blocked isocyanate (HDI) manufactured by Sumitomo Bayer Co., Ltd., Japan
*6 BL-4165: blocked isocyanate (IPDI) manufactured by Sumitomo Bayer Co., Ltd.
*7 The sum of the melamine varnishes of *1 and *2 above.
*8 The blocked aliphatic polyfunctional isocyanates and/or blocked alicyclic polyfunctional isocyanates of *5 above.

(Note)
As the solvent for preparing the clear coatings, Solvesso-150 manufactured by Exxon Chemical Co. was used.

TABLE 2

| | Acid Resistance Test Result | | | | | | |
|---|---|---|---|---|---|---|---|
| | | | Example | | | | |
| | 1 | 2 | 3 | 4 | 5 | 6 | 7 |
| Baking Temperature | | | | | | | |
| *11 120° C. | 0 | 0 | 0 | 0 | 0 | 0 | 0 |
| 140° C. | 0.24 | 0 | 0 | 0 | 0 | 0 | 0 |
| 160° C. | 0.36 | 0.35 | 0.59 | 0.24 | 0.63 | 0.18 | 0.19 |
| *12 120° C. | 0 | 0 | 0 | 0 | 0 | 0 | 0 |
| 140° C. | 0 | 0 | 0 | 0 | 0 | 0 | 0 |
| 160° C. | 0 | 0 | — | 0 | — | 0 | 0 |
| *13 120° C. | 0 | 0 | 0 | 0 | 0 | 0 | 0 |
| 140° C. | 0 | 0.32 | 0 | 0 | 0.36 | 0 | 0 |
| 160° C. | 0 | 0.55 | 0 | 0 | 0.59 | 0 | 0 |
| *14 120° C. | 0 | 0 | 0 | 0 | 0 | 0 | 0 |
| 140° C. | 0 | 0 | 0 | 0 | 0 | 0 | 0 |

TABLE 2-continued

| | Acid Resistance Test Result | | | | | | |
|---|---|---|---|---|---|---|---|
| | | | Example | | | | |
| | 1 | 2 | 3 | 4 | 5 | 6 | 7 |
| 160° C. | 0 | 0 | 0 | 0 | 0.33 | 0 | 0 |

TABLE 3

| | Acid Resistance Test Result | | | | | | |
|---|---|---|---|---|---|---|---|
| | | | Example | | | | |
| | 1 | 2 | 3 | 4 | 5 | 6 | 7 |
| Baking Temperature | | | | | | | |
| *15 120° C. | 0 | 0 | 0 | 0 | 0 | 0 | 0 |
| 140° C. | 0 | 0 | 0 | 0 | 0 | 0 | 0 |
| 160° C. | 0 | 0 | 0.4 | 0 | 0.45 | 0 | 0 |
| *16 120° C. | 0 | 0 | 0 | 0 | 0 | 0 | 0 |
| 140° C. | 0 | 0 | 0 | 0 | 0 | 0 | 0 |
| 160° C. | 0 | 0 | 0.36 | 0 | 0.60 | 0 | 0 |

Acid resistance evaluation method and evaluation criteria
*11 0.4 N hydrochloric acid spotting, 85° C., 15 minutes
*12 40 vol % sulfuric acid immersion, 40° C., 8 hours
*13 40 wt % sulfuric acid spotting, 60° C., 15 minutes
*14 pH 2 sulfuric acid spotting, 60° C., 60 minutes
*15 pH 2 sulfuric acid spotting, 70° C., 60 minutes
*16 pH 2 sulfuric acid spotting, 80° C., 60 minutes
(Note)
In the spotting test, each solution was dropped onto the test piece in an amount of about 0.5 ml and this test piece was allowed to stand for a predetermined time period. Thereafter, the depth of the resulting film corrosion by the solution was measured with the two-dimensional surface roughness meter ("SURFCOM" manufactured by Tokyo Seimitsu Co., Ltd., Japan). The closer to 0 the value, the better the acid resistance (unit: $R_{max}$ ($\mu$m)).

Further, the test pieces having the coated films formed from the clear coatings of Examples 6 and 7 and Comparative Example 1 under the above-described conditions were visually observed for film performance. The results obtained are shown in Table 4.

TABLE 4

| | Performance |
|---|---|
| Example 6 | No abnormality |
| Example 7 | No abnormality |
| Comparative Example 1 | Minute cratering were present |

The following is a comparison between the coating compositions of the above Examples of the present invention and Comparative Example.
Examples (Present Invention): Coating composition of Example 1
Comparative Example 2: Conventional acrylic coating composition curing with melamine resin
Comparative Example 3: Two-pack type acrylic polyol/isocyanate coating composition (Coating composition curing with two-pack type hardener (acrylic polyol/isocyanate))
The results are shown in Table 5.

TABLE 5

| | Example 1 | Comparative Example 2 | Comparative Example 3 |
|---|---|---|---|
| One-pack suitability | E | E | B |
| Workability | E | E | B |
| Acid Resistance (condition *15) (Baking Temperature) | | | |
| 120° C. | 0 | 0.50 | 0.36 |
| 140° C. | 0 | 1.20 | 0.24 |
| 160° C. | 0 | 3.46 | 0.24 |
| Low-Temperature Curability | E | G | E |
| Cost | E | E | B |

Evaluation method

One-pack suitability:
E: No gelation or pitting occurs in 120 hours at 50° C.
B: Abnormality appears in 120 hours at 50° C.
Workability:
E: Good
G: There are cases where sagging or bubbling occurs.
B: Sagging or bubbling is apt to occur.
Acid resistance:
Evaluation was made in the same manner as in Tables 2 and 3.
Low-temperature curability:
E: Excellent film performance is obtained even in baking at 120° C. which is lower than the standard temperature by 20° C.
G: Almost equal film performance is obtained even in baking at the temperature lower than the standard temperature by 20° C.
B: Good film performance is obtained only when baking is conducted at 140° C. for 30 minutes.
Cost:
E: Both the cost of the coating composition and that of the coating equipment are low.
G: Both the cost of the coating composition and that of the coating equipment are medium.
B: Both the cost of the coating composition and that of the coating equipment are high.

While the invention has been described in detail and with reference to specific embodiments thereof, it will be apparent to one skilled in the art that various changes and modifications can be made therein without departing from the spirit and scope thereof.

What is claimed is:

1. A method for producing a coating composition containing a vehicle as a major component, which comprises a step of mixing an acryl resin having a number-average molecular weight of from 1,800 to 8,000, a hydroxyl value of from 60 to 120, and an acid value of from 1 to 25 with a blocked alicyclic polyfunctional isocyanate hardener and then adding an alkyl-etherified melamine resin to the resulting mixture wherein the acryl resin is first mixed with the blocked alicyclic polyfunctional isocyanate and then the alkyl-etherified melamine resin is added.

2. A method as claimed in claim 1, wherein said coating composition comprises:
   (a) from 50 to 80 parts by weight of said acryl resin, and
   (b) from 50 to 20 parts by weight of said hardener
wherein the proportion of said melamine resin to said isocyanate is from 70/30 to 90/10 by weight.

3. A method as claimed in claim 1, wherein from 65 to 75 parts by weight of said acryl resin mixed with from 35 to 25 parts by weight of said hardener.

4. A method as claimed in claim 1, wherein said blocked alicyclic polyfunctional isocyanates are a blocked isophorone diisocyanate or derivative thereof.

5. A method as recited in claim 1, wherein the proportion of said melamine resin to isocyanate in said hardener is from 75/25 to 85/15 by weight.

6. A method as recited in claim 1, wherein the acid value of the acrylic resin is from 8 to 15.

7. A method as recited in claim 1, wherein the number-average molecular weight of the acrylic resin is from 3500 to 5500.

* * * * *